United States Patent Office 3,004,221
Patented Oct. 10, 1961

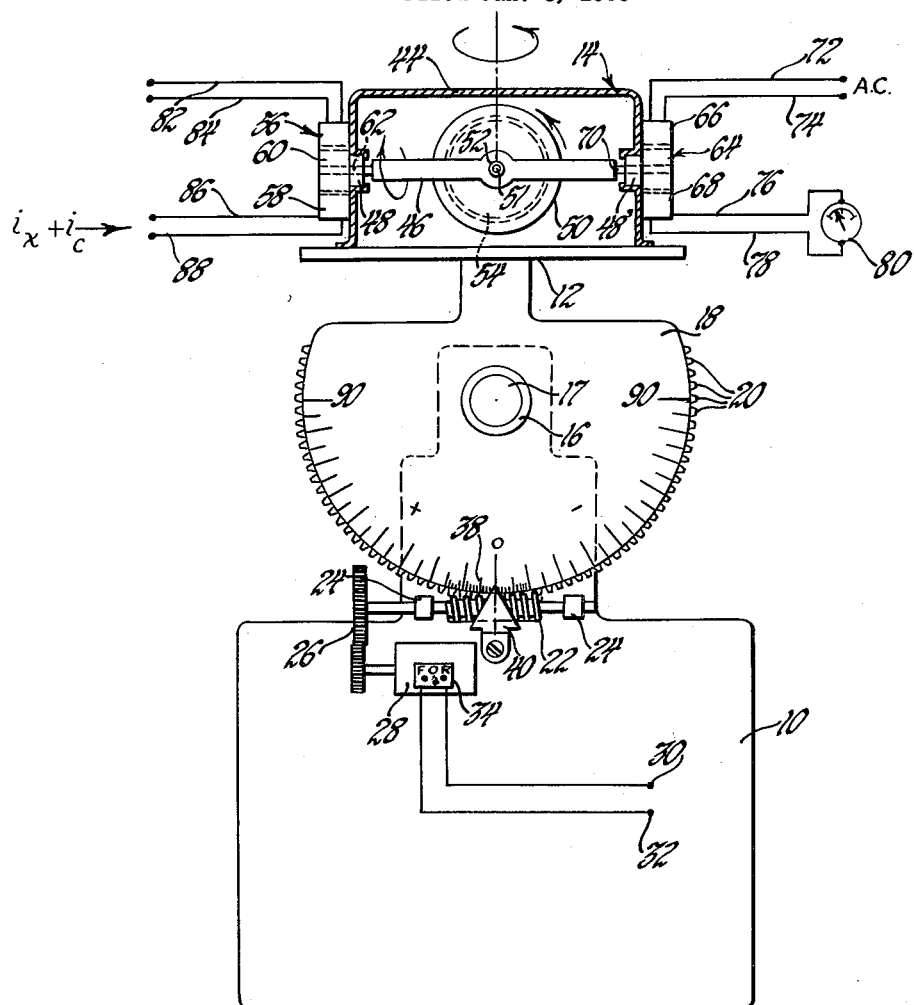
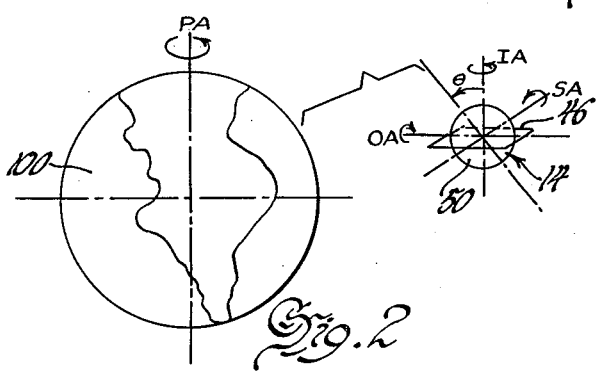

3,004,221
GYRO AMMETER
Edwin F. Katz, Milwaukee, Wis., assignor to General Motors Corporation, Detroit, Mich., a corporation of Delaware
Filed Jan. 3, 1955, Ser. No. 479,345
3 Claims. (Cl. 324—98)

This invention relates to a method of and apparatus for measuring electrical currents using a precision gyroscope sensitive to the rotation of the earth, and more particularly, to a gyro ammeter.

The invention has for its general object to provide a novel method of and apparatus for measuring electrical currents using a precision gyroscope generating a precisely regulated earth-rate precessional torque to provide extremely accurate measurements of small magnitudes of electrical currents with a high degree of resolution.

According to the present invention the torque effect produced by an unknown electrical current to be measured is compared against the constant precisely regulated precesssional torque developed by a precision gyroscope responsive to the rotational speed of the earth. The gyro is then adjusted to sense that component of the rotational rate of the earth as will produce an output torque that will exactly balance or null the opposingly directed torque effect of the unknown current. The system is calibrated by noting the amount of gyro adjustment required to balance the torque effects produced by known currents of different magnitudes from which the unknown current may be measured in terms of the subsequent adjustment of the gyroscope required to attain torque balance.

The nature of the present invention together with the above and other objects and features and the advantages thereof will appear more fully from the following detailed description and drawings wherein:

FIG. 1 illustrates an embodiment of a gyroscopic ammeter for carrying out the present invention; and FIG. 2 is a diagrammatic illustration useful in understanding the principle of operation of the present invention.

Referring to the drawings, there is shown in FIG. 1 a support stand 10 and adjusting mechanism for a tiltable or rotatable turntable or platform 12 which carries a precision gyroscope 14. The upper portion of the stand may include a pair of inwardly extending trunnions or gudgeons, one of which is shown at 16, providing a stationary pivot or shaft 17 rotatably supporting a pair of mutilated wheels, one of which is shown at 18, to which the platform 12 is rigidly secured. The wheel 18 is provided with a plurality of teeth 20 about the periphery thereof that cooperate with an adjustable worm 22. The worm shaft is supported in suitable bearings 24 in the stand 10 and is adapted to be driven slowly through suitable reduction gearing as 26 from a reversible drive motor 28.

The drive motor 28 is a constant speed motor that is energized from a constant or regulated source of A.C. or D.C. supply voltage applied to the terminals 30 and 32 and may be provided with a suitable energizing and reversing switch or controller 34 through which power is supplied to the motor to rotate the wheel 18 in either direction. The face of the wheel 18 is provided with graduated angular indicia 38 which are adapted to cooperate with a fixed stationary pointer 40 mounted on the support stand 10 to indicate the declination of the table.

The gyro 14 includes a housing 44 that is mounted on the platform 12 and rotatably supports a frame or gimbal ring 46 that is pivotable on a longitudinal axis in aligned precision jewel bearings 48, 48' at oppositely spaced ends of the housing. Within the frame or gimbal 46 is a gyro wheel 50, which is mounted on a shaft 51 normal to the plane of the drawings and is supported in jeweled bearings such as 52 in the longitudinally extending sides of the frame or gimbal. The gyro wheel 50 is driven at a high, constant speed, such as 12,000 r.p.m., in any suitable manner as by an electric motor 54 that is contained within the rim of the spinning wheel and is energized from a source of constant voltage, not shown. To reduce frictional effects, the gyro may be floated in a liquid contained within the housing enclosure 44 in accordance with well known practices.

Satisfactory operation of the invention requires that the gyro 14 be of the high precision variety and sufficiently sensitive to develop a precessional output torque in response to the rotational movement of the earth, the gyro employed to carry out the present invention being one with a maximum output torque of $75 \times 10^6$ dyne cm. sec.

Fastened to one end of the gyro housing 44 is a precision microsyn torque motor or like device 56 having a stator 58 and a rotor 60 which is secured to one of the pivots 62 of the gimbal 46. Mounted on the opposite side of the gyro housing is a precision microsyn generator device 64 also having a stator 66 and a rotor 68 which is fastened to the pivot 70 at the other end of the gimbal. The microsyn torque motor device 56 and the signal generator device 64 are of the type well known in the art, the stators of which are of the salient pole variety having an excitation winding and a signal winding and the rotors of which are of the permanent magnet variety.

The excitation winding of the microsyn generator 64 is adapted to be connected over conductors 72, 74 to a constant source of alternating current, and its signal output winding is connected over conductors 76, 78 to a zero center indicating instrument 80 of high input impedance such as a vacuum tube voltmeter. The excitation winding of the microsyn torque motor is adapted to be connected over conductors 82, 84 preferably to a constant source of alternating current such as that to which the excitation winding of the microsyn generator is connected. The signal input winding of the torque device is connected to conductors 86, 88 on which is impressed the unknown current to be measured.

Before proceeding further with the description of the apparatus of FIG. 1, reference is made to FIG. 2 in which there is shown the gyroscope 14 and a diagrammatic representation of the earth 100. The gyro 14 is shown with its wheel 50 mounted on a spin axis, SA, normal to the polar or rotational axis, PA, of the earth and with its input axis, IA, parallel to the polar axis of the earth. With the gyro wheel rotating in the counterclockwise direction shown and the gyro oriented so that its input axis IA is parallel to the polar axis of the earth, the rotation of the earth will exert a torque or running moment about the input axis, IA, of the gyro. If the gyro is permitted to move in but a single plane or direction about its output axis, as in FIG. 1, the gyro will precess or rotate 90 degrees about its output axis, OA, in the direction shown due to the rotational effect of the earth until the position of the input axis corresponds with the previous spin axis of the gyro in which position the gyro input axis will be normal to the polar axis of the earth and no turning moment due to the earth's rotation will be exerted thereon.

In the present invention the earth-rate precessional torque of the gyro is employed to measure the magnitude of an unknown A.C. or D.C. electrical current $i_x$ by passing the current through the conductors 86, 88 in circuit with the microsyn torque device 56 which develops a torque or turning moment on the output axis of the gyroscope that is proportional to the magnitude of the unknown current and is oppositely directed to the earth-rate precessional torque. By tilting the turntable 12 through the drive motor 28 and table tilting mechanism previously described, the input axis, IA, of the gyroscope can be made to assume any angle $\theta$ from 0 to 90 degrees relative to the earth's polar axis and to sense any component from zero to full or maximum of the earth-rate input torque. The output torque of the gyroscope is sensed by the signal generator 64, which develops a signal voltage that is applied to the indicating instrument 80, and may be adjusted in the above manner to balance or null the torque produced by the torquer 56 at which time the net output torque will be zero as indicated by a zero or null reading on the indicating instrument 80.

The system may be calibrated by noting the gyro adjustment in terms of table angle required to balance the system for known currents of different magnitudes and a calibration curve plotted therefrom relating table angle with current input. The unknown current then may be read as a function of table angle or the worm wheel 18 calibrated directly in terms of current.

In order to correct for gyro drift caused by slight mechanical balance and friction in the parts of the gyro, a constant D.C. compensating current, $i_c$, may be mixed with and applied to the input winding of the microsyn torque device 56, as indicated in FIG. 1.

Since the apparatus depends for its operation simply on comparing the torque produced by the current to be measured against the precisely regulated and constant earth-rate precessional torque developed by a precision gyro, it will be seen that the apparatus of the present invention, unlike other known forms of current measuring devices, is independent of frequency and/or phase of the currents to be measured. Extremely precise measurements are obtained as the measurements are referenced to or compared against the constant rotational rate of the earth. With precision gyros that are sensitive to the earth's rotation to within one part in several thousand, as in the case of the $75 \times 10^6$ dyne cm. gyro employed herein which is sensitive to the rotation of the earth to an accuracy of within 1 part in 1700, the system will offer a resolution of 1 part in 1700 or permit accurate readings or measurements to four places or better.

While the invention has been described herein as applied to the measurement of electrical current, it is apparent that the principle thereof may be employed to measure other electrical quantities as well.

What is claimed is:

1. The method of measuring an unknown current which comprises the steps of sensing the rotation of the earth and developing a torque proportional thereto, developing an opposing torque proportional to the current to be measured, selecting a fractional part of the torque proportional to the rotation of the earth to balance the opposing torque effect produced by the unknown current, and comparing the balancing torque for the unknown current with that required for a known magnitude of current.

2. Electrical current measuring apparatus comprising the combination of a precision gyroscope sensitive to and developing an output torque proportional to the rotation of the earth, an electrical torque device coupled to the output of the gyroscope and having a winding energized by the current to be measured to produce an opposing torque on the output of the gyroscope proportional to the current to be measured, and an adjustable table mount for the gyroscope and table adjusting mechanism for changing the declination of the gyroscope and the torque developed thereby.

3. Electrical current measuring apparatus comprising the combination of a precision gyroscope sensitive to and developing an output torque proportional to the rotation of the earth, a torque microsyn device coupled to the output of the gyroscope and having a torque winding adapted to be energized by the current to be measured to produce an opposing torque on the output of the gyroscope proportional to the current to be measured, a signal generator microsyn device coupled to the output of the gyroscope and a null indicating voltmeter connected for energization from the signal generator microsyn, and an adjustable table mount for the gyroscope and table adjusting mechanism for changing the declination of the gyroscope and the torque developed thereby.

No references cited.

UNITED STATES PATENT OFFICE
CERTIFICATE OF CORRECTION

Patent No. 3,004,221            October 10, 1961

Edwin F. Katz

It is hereby certified that error appears in the above numbered patent requiring correction and that the said Letters Patent should read as corrected below.

Column 2, line 54, for "running" read -- turning --.

Signed and sealed this 10th day of April 1962.

(SEAL)
Attest:

ERNEST W. SWIDER

Attesting Officer

DAVID L. LADD
Commissioner of Patents